No. 850,586. PATENTED APR. 16, 1907.
W. C. KIRK.
CURVED PIPE.
APPLICATION FILED JUNE 11, 1906.

Witnesses:
Elmer R. Shipley
M. S. Belden

William Clark Kirk
Inventor
by James W. See
Attorney

UNITED STATES PATENT OFFICE.

WILLIAM CLARK KIRK, OF CHATTANOOGA, TENNESSEE.

CURVED PIPE.

No. 850,586.  Specification of Letters Patent.  Patented April 16, 1907.

Application filed June 11, 1906. Serial No. 321,118.

*To all whom it may concern:*

Be it known that I, WILLIAM CLARK KIRK, a citizen of the United States, residing at Chattanooga, Hamilton county, Tennessee, have invented certain new and useful Improvements in Curved Pipes, of which the following is a specification.

This invention will be readily understood from the following description, taken in connection with the accompanying drawings, in which—

Figure 1:
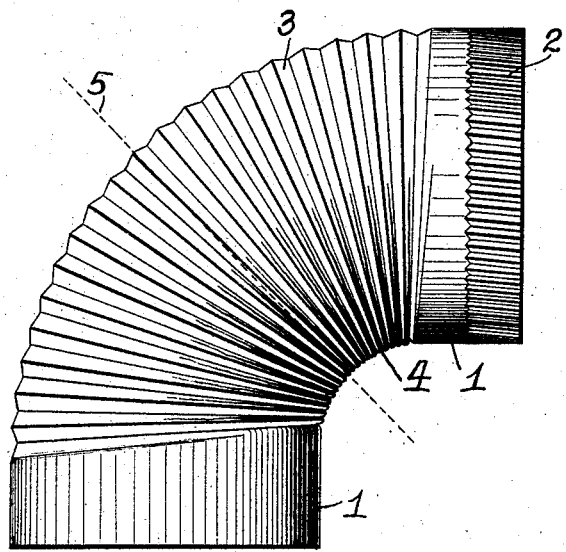
Figure 2:
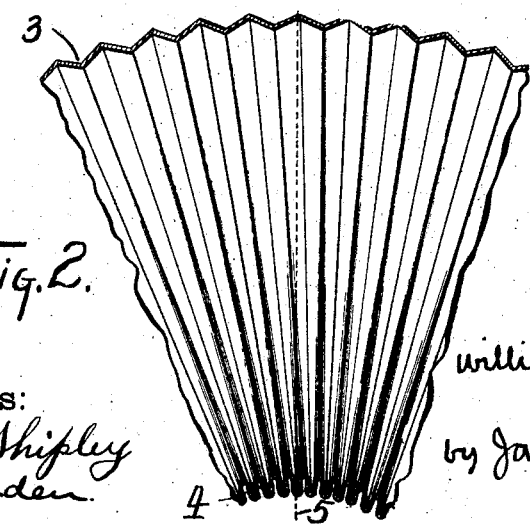

Figure 1 is a side elevation of a stovepipe-elbow embodying my invention, and Fig. 2 a section of a portion of the elbow in a plane cutting the axis of the pipe at right angles to the axis of the curve of the elbow.

In the drawings, 1 indicates the elbowed pipe generally; 2, longitudinal corrugations at one end of the elbow to serve in reducing its diameter somewhat, so as to permit its more ready insertion into a pipe with which the elbow is to be associated, as is usual in stovepipe-elbows; 3, a continuous helical corrugation extending around the pipe throughout such portion of its length as is to be curved; 4, transverse condensations of these corrugations at the inner curve of the elbow, this condensation being at its maximum at the inner curve of the elbow and gradually and regularly lessening as the helical corrugations pass around the pipe to the outer curve of the elbow, at which point they have their minimum condensation, the pitch of the helix being therefore the greatest at the outer curve of the elbow and the least at its inner curve, and 5 a line drawn radial to the curve of the elbow and serving to bring before the eye the helicoidal characteristic of the corrugations.

If a plain pipe be corrugated helically, the only general effect upon the form of the pipe will be to shorten it. If, however, such helically-corrugated pipe have its corrugations condensed at one side, that side of the pipe will be still further shortened and the pipe become curved, and the result will be the elbow which has been described, understanding, of course, that the condensation of the corrugations at the inside of the curve is continued, but gradually lessened toward the outside of the curve.

In the production of my improved elbow the corrugation, considered as a mere helix, is produced by a tool moving continuously from start to finish of the helix, the depth of working of the tools being such as to make the corrugations of greater depth and less pitch at one side of the pipe than at the opposite side, the depth of the corrugation gradually decreasing and its pitch increasing from the first-mentioned side. The result is a corrugated pipe-elbow formed by a single continuous corrugation producible by a continuous operation with rapidity and economy.

It will be obvious that while the illustration sets forth a pipe-elbow representing a ninety-degree turn any desired degree of curvature and any desired compounding of curves—as, for instance, an offset or reversed curving—is readily obtainable.

I claim—

A permanently-curved pipe of round cross-section, having a continuous helical corrugation varying regularly in depth and pitch, the pitch increasing and the depth decreasing from the inner toward the outer edge of the curve.

WILLIAM CLARK KIRK.

Witnesses:
M. V. GRISCOM.
H. H. ADKINS